Patented Feb. 3, 1948

2,435,504

UNITED STATES PATENT OFFICE 2,435,504

WELDING ROD

David L. Mathias, East Orange, N. J., assignor to Metal & Thermit Corporation, New York, N. Y., a corporation of New Jersey No Drawing. Application December 26, 1944, Serial No. 569,910

4 Claims. (Cl. 219—8)

1

This invention relates generally to electric welding, to welding rods, to a coating for core wire, and to a process of making welding rods.

Welding rods commonly have a coating whose composition is based on the average composition of the type of steel which is to be welded and when an attempt is made to weld steel whose composition differs markedly from that for which the weld rod was designed, difficulties are encountered and unsatisfactory welds frequently result.

The welding of air hardening steels has brought new problems to the welding industry because of the requirement that welds shall not have any tendency to crack. Cracking of welds or parent metal has heretofore been a serious problem in this field, and has been thought to be due to hydrogen formed during the welding.

It is an object of this invention to produce a heavy, all mineral flux coating for electrodes which will facilitate the production of a sound weld deposit having good tensile strength, elongation and ductility. Another object of the invention is to make weld rods which can be used in all-position welding and which will produce welds substantially free from the tendency to crack in the weld or adjacent parent metal. Another object of the invention is to make weld rods which are useful in the welding of air hardening steels. Other objects and advantages of the invention will presently be apparent.

The objects of the invention are attained generally speaking by a weld rod having a core wire of plain carbon or alloy steel and a coating whose major ingredients are an inorganic fluoride, an alkaline earth metal carbonate, and a metallic alloying and/or deoxidizing compound; and which in its preferred form contains minor ingredients comprising small amounts of homogenizing and fluxing agents. In addition, the weld rod coating contains a substantial percentage of an arc stabilizer.

Any ferrous base core may be used for the weld rod; it may be a plain carbon or alloy steel, either high alloy or low alloy.

One of the three major ingredients of the electrode coating is an inorganic fluoride which may be either soluble or insoluble. The insoluble fluorides are preferred to the soluble fluorides because of ease of production. A very satisfactory fluoride is fluorspar. Another is cryolite. These are but examples which illustrate the principle. One of the purposes of the fluorides in the composition is to act as a fluxing agent, and to this extent they may be called fluxing agents. A mean of good practice is found at about 40%;

2 that is, a weld rod coating otherwise conforming to this invention will be in the range of good practice if the fluxing agent approximates 40% of the weight of the coating. This approximation need not be close because all percentages up to 48 and down to 32 have been found satisfactory. In addition, the percentage of the fluxing agent has been reduced as low as 23% with some success in certain uses.

Another of the basic ingredients of the weld rod coating is an alkaline earth metal carbonate, a satisfactory example of which is calcium carbonate, which is readily available in large quantities at low cost. The other alkaline earth metal carbonates are also useful. The carbonate eliminates the need for reducible oxides in the coating and provides a source of carbon dioxide which forms a protective atmosphere about the arc thus shielding the weld metal from atmospheric contamination. A mean of good practice is found when the carbonate is present in approximately 40% of the weight of the weld rod coating. This mean need not be closely approximated to produce satisfactory results because all percentages up to 48 and down to 32 have been found useful in compositions otherwise conforming to this disclosure. In addition, certain compositions have contained as much as 50%, and others as little as 25% of this ingredient with results satisfactory for some uses.

The third of the basic ingredients is composed of metallic deoxidizers and alloying constituents of which ferrotitanium is preferred. Ferromanganese and ferrosilicon are also useful members of this class. A mean of good practice is found at about 9.5% of deoxidizer, which may be made up, for example, from a mean of 4% ferrotitanium, a mean of 2.5% of ferromanganese, and a mean of 3% of ferrosilicon. When only one of these deoxidizers is used it is preferably ferrotitanium, whose percentage may be increased proportionately to make up for the absence of the ferromanganese and the ferrosilicon. It is also possible to use ferrotitanium with either ferrosilicon or ferromanganese. When ferromanganese is employed it has been possible to increase its content from the mean up to about 5% with satisfactory results, and to reduce it to very small amounts. When ferrosilicon is employed its content may be increased to about 6% with satisfactory results. In general, it is preferred to use about 2 to about 15% of deoxidizer.

Satisfactory weld rod coatings can be made from the foregoing basic ingredients alone, but in preferred practice it is frequently desirable to add other ingredients which serve their own purpose and impart certain of their properties to the weld rod, the arc, or the weld. Silica or other silicon bearing compounds of the fluxing agent type may be included for fluxing purposes. When used, it can be varied upward to about 6% and downward to 0.5% or less with satisfactory results. For the purpose of facilitating manufacture, homogenizers such as china clay and bentonite can be employed, the china clay varying from 0.5% to about 5% and the bentonite from 0.5% to about 3%, the clay and bentonite content aggregating, in the average about 4.25%.

In addition to the ingredients which have been set forth hereinbefore, feldspar may be added in amounts up to as much as 17% with good results.

Each of the foregoing constituents contributes something to the making of the weld rod, to its use, to the manner in which it functions, or to the weld which is produced, so that in preferred practice the weld rod would be composed of a plain carbon or alloy steel core wire as defined hereinabove and a coating which contains a metallic alloying and deoxidizing ingredient, an alkaline earth metal carbonate, an inorganic fluoride, a homogenizer, a flux, and feldspar.

The weld rod is made by mixing an aqueous binder with the dry ingredients of a coating conforming to this invention, applying the coating to the core wire, and drying it at a suitable temperature. Drying for about one hour at about 600° F. has been found to be satisfactory. Drying at temperatures much in excess of 600° F. and for extended periods of time tends to break down the carbonate.

The following examples are given to illustrate sound practice within the scope of the invention; they do not constitute a limitation.

*Example I*

The following ground and dried ingredients were thoroughly mixed:

| | Parts by weight |
|---|---|
| Feldspar | 8.86 |
| Fluorspar | 35.39 |
| Calcium carbonate | 38.30 |
| Ferromanganese (80% manganese) | 2.45 |
| Silica | 2.62 |
| Bentonite | 1.74 |
| Ferrosilicon (50% silicon) | 3.14 |
| China clay | 2.56 |
| Ferrotitanium (42% titanium) | 4.89 |

An aqueous solution of sodium silicate was added to serve as a binder and the mixture was applied to the core wire. It was dried at a suitable temperature.

The weld rods of this invention have been used in all positions to weld steels of varying composition, and have produced sound and uniform welds possessed of high ductility, and high tensile strength.

The following example illustrates the favorable relationship obtained between ductility and tensile strength in two welds obtained from rods having $\frac{3}{16}''$ diameter mild steel core wires coated with the described composition.

*Example II*

| | Rod A | Rod B |
|---|---|---|
| Yield point, p. s. i | 57,250 | 56,750 |
| Ultimate strength, p. s. i | 67,750 | 67,750 |
| Elongation, per cent in 2'' | 33.6 | 31.3 |
| Reduction of area, per cent | 72.3 | 62.6 |
| Fracture | (¹) | (¹) |

¹ Cup and cone.

Weld rods made according to this invention may be used for all-position welding with either direct or alternating current. Their performance characteristics are consistent and the size of the electrode and the thickness of the metal to be welded do not materially affect the properties of the deposited metal.

As many apparently widely different embodiments of this invention may be made without departing from the spirit and scope thereof, it is to be understood that I do not limit myself to the specific embodiments thereof except as defined in the appended claims.

I claim:

1. A weld rod coating comprising about 40% fluorspar, about 40% $CaCO_3$, and about 9.5% ferrotitanium, said coating being free of hydrous materials.

2. A weld rod coating comprising about 23 to 48% fluorspar, about 25 to 50% $CaCO_3$, and about 2 to 15% ferrotitanium, said coating being free of hydrous materials.

3. A weld rod coating comprising feldspar about 8.86%; fluorspar about 35.39%; $CaCO_3$ about 38.30% ferromanganese about 2.45%; silica about 2.62%; bentonite about 1.74%; ferrosilicon about 3.14%; china clay about 2.56%; ferrotitanium about 4.89%.

4. A weld rod coating comprising fluorspar about 23 to 48%; $CaCO_3$ about 25 to 50%; ferrotitanium about 2 to 15%; silica about 0.5 to 6%; china clay about 0.5 to 5%; bentonite about 0.5 to 3%; feldspar about 0 to 17%; ferromanganese about 0 to 5%; ferrosilicon about 0 to 6%.

DAVID L. MATHIAS.

REFERENCES CITED

The following references are of record in the file of this patent:

UNITED STATES PATENTS

| Number | Name | Date |
|---|---|---|
| 1,909,217 | Notvest | May 16, 1933 |
| 2,043,927 | Kronbach | June 9, 1936 |
| 2,048,174 | Austin | July 21, 1936 |

FOREIGN PATENTS

| Number | Country | Date |
|---|---|---|
| 409,293 | Great Britain | Apr. 24, 1934 |